Patented June 3, 1924.

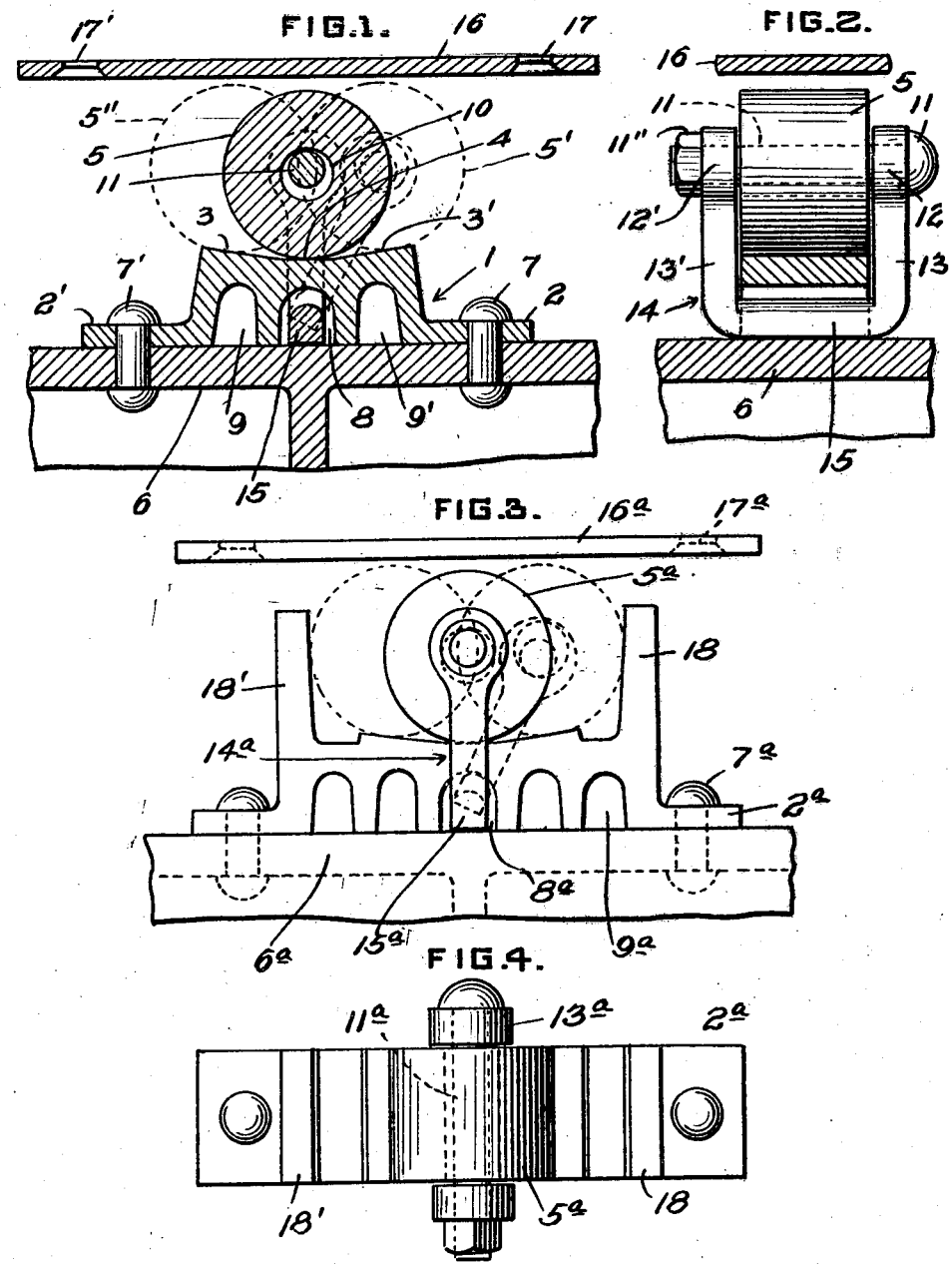

1,496,030

UNITED STATES PATENT OFFICE.

ARTHUR B. SEVERN, OF PITTSBURGH, PENNSYLVANIA, ASSIGNOR TO A. STUCKI, OF PITTSBURGH, PENNSYLVANIA.

ROLLER SIDE BEARING.

Application filed May 21, 1923. Serial No. 640,290.

*To all whom it may concern:*

Be it known that I, ARTHUR B. SEVERN, a citizen of the United States, and a resident of Pittsburgh, in the county of Allegheny and State of Pennsylvania, have invented a new and useful Improvement in Roller Side Bearings, of which the following is a specification.

This invention relates to side bearings and particularly to side bearings for railway cars in which one bearing surface or wear plate is affixed to the truck while the remaining one is attached to the car body.

It is an object of the invention to provide a bearing of this type which is simple in construction, contains but a few parts, is easy and economical to manufacture, is highly effective in operation, and is self-cleaning.

It is a special object to provide a bearing in which the customary cage for retaining the roller in position is entirely dispensed with, leaving the wear plate upon which the roller rests exposed at all sides whereby to simplify the construction and to render the bearing readily self-cleaning.

It is a further special object to provide a bearing in which the roller is positioned laterally of its bearing surface and limited in its travel longitudinally thereof by a single anchoring means, said anchoring means performing not only the customary purposes of the usual side and end wall of the cage but also preventing displacement and loss of the roller.

It is still a further special object to provide a novel form of anchoring device for the roller of the character above noted, and to so associate the said device with the main bearing plate that the mounting of the said plate will effectively retain the same in operative relation without the use of special attaching or fastening means, the attaching means illustrated serving a dual purpose.

An additional object is to provide a bearing all of the parts of which may be fabricated from a minimum quantity of material rendering the entire bearing extremely light in weight, but without sacrificing its effective mode of functioning, its life or its strength.

These and other objects of the invention will more fully appear when taken in conjunction with the following description and the appended claims.

In the drawings, Fig. 1 is a vertical sectional view taken through one embodiment of the invention, illustrating the roller in its centered position; Fig. 2 a transverse sectional view, with parts in elevation of the embodiment illustrated in Fig. 1; Fig. 3 a side elevation of a modified form of the invention, illustrating the use of emergency abutment stops for limiting the longitudinal travel of the roller; and Fig. 4 a plan view of the modification illustrated in Fig. 3.

The main bearing plate is indicated generally by the reference numeral 1, the plate being provided at its opposite ends with the base flanges 2, 2', and at its intermediate portion with an elevated or raised bearing surface, the extremities 3, 3' of which gradually incline towards an intermediate flat portion 4 upon which the roller 5 normally rests in its centered position. The bearing plate 1 is adapted to be attached to the truck in any of the well known ways, one method of attaching the same being by riveting or bolting to the truck bolster 6 as at 7, 7'.

The body plate 1 comprises, as above described, the base flanges and the intermediate elevated bearing surface for the roller, the bearing surface being elevated by thickening the metal lying between the said flanges, as clearly shown in the drawings. The bottom face of the bearing plate, opposite the intermediate flat portion 4, is recessed to form the transverse groove 8 extending the full width of the plate. Besides the groove 8, the thickened portion may be similarly recessed as indicated at 9, 9', so as to reduce the quantity of material used as well as to render the bearing light in weight.

The roller 5 is preferably cylindrical in shape and is provided with an axial bore 10 for the reception of a pivot pin 11 in the form of a bolt extending through the apertured ears 12, 12' formed at the upper ends of the legs 13, 13' respectively, of an anchoring yoke 14. The main body of the yoke 14 is U-shaped, having the upstanding legs 13, 13' connected by an intermediate portion 15. The pivot bolt 11 is of a well known form having the head 11' and the cooperating nut 11'', the diameter thereof being somewhat smaller than the diameter of the axial bore 10 in the roller.

In assembling the several parts, the intermediate portion 15 of the yoke is disposed freely within the transverse groove 8 in the bottom face of the bearing plate, and the bearing plate subsequently fixed to the supporting bolster of the truck, whereby the securing of the bearing plate upon the bolster also serves to retain the yoke in operative position with respect thereto. The cross sectional dimension of the intermediate portion 15 is also somewhat smaller than the groove 8 in which it lies, not only serving as a pivotal mounting for the yoke but permitting slight bodily movement thereof, similar to the pivotal connection between the pivot bolt 11 and the roller.

The upper wear plate is indicated at 16, being attached to the car body in any of the well known ways, suitable apertures such as shown at 17, 17′ being provided whereby the plate may be riveted or bolted to the body bolster or other desired point.

In operation, the upper bearing plate 16 is normally out of contact with the roller 8 which remains in its centered position, upon the intermediate flat portion 4, as shown in Fig. 1. Whenever the car body sways sufficiently, as in rounding curves, the bearing plate 16 is brought into contact with the roller, and during subsequent swivelling movement between the truck and car body the roller will be forced to travel along the upper surface of the plate 1, traversing the inclined extremity 3 or 3′, as the case may be, in a well known manner. Immediately after contact between the upper bearing plate and the roller 5 is broken, due to the upward movement of the wear plate 16, the roller immediately automatically returns to its normal centered position due to the downwardly inclined portions 3, 3′, returning the roller to the intermediate flat portion and causing the roller to rest thereupon until again brought into operation by contact of the wear plate 16. The weight of the anchoring yoke not only assists in returning the roller to its centered position but tends to reduce oscillation of the roller while the upper wear plate is out of contact therewith.

During the travel of the roller lengthwise of the bearing surface upon which it rests, the legs 13, 13′ of the yoke confine the roller and position the same laterally in proper relation to the bearing surface, the intermediate portion 15 pivotally locking within the groove 8, and the bolt or pin 11 similarly coacting with the bore 10. The dimensions of the several parts are such that the anchoring yoke, including the bolt 11, serves to limit the travel of the roller upon the bearing surface, the extreme limits of movement of the roller being indicated by the dotted lines 5′ and 5″, in Fig. 1 of the drawings.

In Figs. 3 and 4, a modified form of the invention has been illustrated. This modified form corresponds in every respect with the form just described, with the exception that the intermediate thickened portion of the bearing plate is somewhat longer, is provided with a greater number of transverse recesses or grooves in its bottom face, and is equipped at its opposite ends with the upstanding emergency abutment lugs indicated at 18, 18′. Consequently, the construction of the modified form need not be described in detail, the corresponding elements therein being designated by the same reference numerals employed in connection with the description of the first described form with the addition of an exponent "a".

The operation of the modified form corresponds exactly with that of the first described embodiment, the travel of the roller lengthwise of the bearing being limited by the single unitary yoke structure as pointed out in connection therewith. The upstanding abutments 18, 18′ are merely intended as additional means for limiting the lengthwise travel of the roller in cases of emergencies, as will be obvious to those familiar with this art.

It is noted that the invention provides a very simple bearing structure, composed of but few parts, and in which a single anchoring means in the form of a retaining yoke serves several functions, the anchoring yoke serving to position the roller laterally of the bearing plate, to limit its longitudinal travel thereon, prevent removal of the roller therefrom, and to assist in centering the roller, and one in which the parts are so associated that the attaching means for the bearing plate also functions as a means for retaining the anchoring yoke in assembled relation therewith.

It is especially noted that the structure defined may be easily manufactured and at a comparatively low cost, due to the fact that the anchoring yoke is in the form of a simple forging, and the entire bearing plate may be fabricated by a rolling process, a continuous rolled section of the desired shape being first produced, and the plates subsequently formed therefrom by severing or cutting the rolled form into the desired lengths corresponding to the width of the bearing desired.

I claim:

1. A roller side bearing for railway cars comprising a plate having a raised portion providing an upper continuous bearing surface, a roller positioned on said plate, and a single anchoring means embracing the plate for attaching the roller to the plate, said anchoring means being adapted to position the roller laterally of the plate, limit its longitudinal travel thereon, and prevent its removal therefrom.

2. A roller side bearing for railway cars comprising a plate freely exposed at all sides and providing an upper continuous bearing surface, a roller positioned on the plate and an anchoring yoke embracing the plate for attaching the roller to the plate, said anchoring yoke serving to position the roller laterally of the plate, limit its longitudinal travel thereon, and prevent its removal therefrom.

3. A roller side bearing for railway cars comprising a plate having a raised portion providing an upper continuous bearing surface, the underside of said plate having a groove, a roller positioned on the bearing surface, and means cooperating with the said groove and pivotally attached to the roller, said means serving to position the roller laterally of the plate, limit its longitudinal travel thereon, and prevent its removal therefrom.

4. A roller side bearing for railway cars comprising a plate freely exposed at all sides and having a raised portion providing an upper continuous bearing surface, the underside of said plate having a groove, a roller having an axial bore therethrough positioned on the bearing surface, a yoke having a U-shaped body with its intermediate portion freely disposed within the said groove, and its side portions embracing said plate, and a pin or bolt connecting said side portions and loosely fitting within the said bore, said yoke serving to position the roller laterally of the plate, limit its longitudinal travel thereon, and prevent its removal therefrom.

In testimony whereof, I sign my name.

ARTHUR B. SEVERN.

Witness:
EDWIN O. JOHNS.